United States Patent
Yamazaki et al.

(10) Patent No.: US 8,632,229 B2
(45) Date of Patent: Jan. 21, 2014

(54) VEHICLE HEADLAMP SYSTEM

(75) Inventors: Atsushi Yamazaki, Shizuoka (JP); Akira Konishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 490 days.

(21) Appl. No.: 12/874,239

(22) Filed: Sep. 2, 2010

(65) Prior Publication Data

US 2011/0063860 A1    Mar. 17, 2011

(30) Foreign Application Priority Data

Sep. 14, 2009    (JP) ................. 2009-211507

(51) Int. Cl.
  G06F 7/00        (2006.01)
  G01B 5/00        (2006.01)
  G01B 13/18       (2006.01)
  G01B 21/22       (2006.01)
  G01D 21/00       (2006.01)
  B60Q 1/00        (2006.01)
  F21V 1/00        (2006.01)

(52) U.S. Cl.
   USPC ............................. 362/466; 362/460; 701/36

(58) Field of Classification Search
   USPC .............. 340/468; 362/459–466; 364/424.01; 701/29.1–34.4, 36–49
   See application file for complete search history.

(56) References Cited

U.S. PATENT DOCUMENTS

| | | | |
|---|---|---|---|
| 6,305,823 B1 * | 10/2001 | Toda et al. | 362/276 |
| 2005/0083702 A1 * | 4/2005 | Nishimura | 362/464 |
| 2005/0174785 A1 * | 8/2005 | Yamazaki | 362/460 |
| 2006/0139938 A1 * | 6/2006 | Hayami | 362/466 |
| 2007/0263398 A1 * | 11/2007 | Mizuno | 362/460 |

FOREIGN PATENT DOCUMENTS

| | | |
|---|---|---|
| EP | 0 830 982 A2 | 3/1998 |
| JP | 10-35358 | 2/1998 |
| JP | 2001-328484 | 11/2001 |
| JP | 2006-160036 | 6/2006 |

OTHER PUBLICATIONS

Communication from the European Patent Office in Patent Application No. 10175509.8, (7 pages) (Jun. 6, 2013).

* cited by examiner

*Primary Examiner* — Khoi Tran
*Assistant Examiner* — Abby Lin
(74) *Attorney, Agent, or Firm* — Fish & Richardson P.C.

(57) ABSTRACT

A vehicle headlamp system includes a headlamp having multiple control devices and an ECU. Each of the control devices controls a light irradiation condition of the headlamp. The ECU stores vehicle constants, error code information and initialization information corresponding to different types of vehicle, and controls the control devices. When a vehicle type is changed, the ECU selects at least one of the vehicle constants corresponding to the changed vehicle type, clears the stored error code information and the initialization information after selecting the at least one of the vehicle constants, stores initialization information corresponding to the changed vehicle type, and initializes the control devices. The ECU recognizes dependencies between the control devices and, if the control devices include a first control device that is independent, executes normal control by the first control device directly after initializing the first control device.

2 Claims, 5 Drawing Sheets

FIG. 3

| | TYPES<br>CONSTANTS | A | B | C |
|---|---|---|---|---|
| LEVELING DEVICE | HEADLAMP SIZE, SUSPENSION SPRING CONST, TIRE SPRING CONST, WHEELBASE, SEAT POSITION, MAX LOADING CAPACITY, ETC. | ○ | ○ | ○ |
| | SINGLE V-HEIGHT SENSOR | | ○ | ○ |
| | TWO V-HEIGHT SENSORS | ○ | | |
| SWIVELING DEVICE | SWIVEL SPEED, SWIVEL ANGLE RANGE, ETC. | ○ | ○ | × |
| HEADLAMP CLEANER | EJECTION FREQUENCY, EJECTION PERIOD, ETC. | ○ | × | ○ | ns
VEHICLE HEADLAMP SYSTEM

CROSS-REFERENCE TO RELATED APPLICATIONS

The present application claims priority from Japanese Patent Application No. 2009-211507 filed on Sep. 14, 2009, the entire content of which is incorporated herein by reference.

FIELD OF THE DISCLOSURE

The present disclosure relates to a headlamp of a vehicle such as an automobile and, more particularly, to a vehicle headlamp system configured to automatically control and change a light irradiation condition, such as a light irradiation direction, of a headlamp.

BACKGROUND

A related art headlamp system is configured to automatically control a light irradiation direction of a headlamp to enhance traveling safety of a vehicle. For example, the system includes a leveling device configured to control and change the light irradiation direction of the headlamp in a vertical direction in accordance with variations in a pitch angle of the vehicle (i.e., an inclination angle of the vehicle along a front-rear direction of the vehicle) which may be caused by a change of occupants or a change of a load carried on the vehicle. The system also may be include a swiveling device configured to control and change the light irradiation direction of the headlamp in a horizontal direction so as to follow variations in a steering angle. The swiveling device includes a cornering lamp device having multiple lamp units in the headlamp and configured to automatically turn on or off of the lamp units to control and substantially change the light irradiation direction of the headlamp in the horizontal direction. The system may also include a lamp headlamp cleaner configured to automatically clean a front cover of the headlamp.

The headlamp system having such multiple of functions includes an electronic control unit (ECU) for centralized control of the respective functions. The ECU is programmed to carry out the respective functions. More specifically, the ECU is configured to detect variations in the pitch angle, the steering angle, and/or dirt on the headlamp and to automatically control, based on the detected data, the leveling device, the swiveling device and/or the lamp headlamp cleaner. However, the vehicle type differs depending on grade and specifications of the vehicle and, if the ECU is prepared for each type of vehicle, manufacture and management of the ECUs become onerous. In view of this, there is proposed an ECU of a generalized type. This type of ECU is installed with a program that can be commonly used for different types of vehicle. Vehicle constants, which differ for each type of vehicle, are stored in a memory of the ECU in advance, so that a vehicle constant that corresponds to the type of vehicle to be controlled can be selected to carry out a normal control corresponding to the vehicle type.

For example, a related art auto-leveling system for a vehicle headlamp uses such an ECU. According to this related art system, when a specification signal for selecting a vehicle constant that corresponds to a vehicle type is entered into the ECU, a specification signal recognition section of the ECU recognizes the vehicle type, and the ECU transmits a specification signal that corresponds to the recognized vehicle type to the outside for verification (see, e.g., JP 2006-160036 A).

Some ECUs of this type have a diagnosis communication function. By using the diagnosis communication function, reception and transmission of the specification signals are carried out. The ECU having the diagnosis communication function obtains error codes (i.e., diagnostic trouble codes (DTCs) during a self-diagnostic operation), and stores the DTCs in a memory, and reads the DTCs when needed. These codes are specific to different types of vehicle. Therefore, when specifications of a vehicle are changed as the result of an addition or replacement of options to the vehicle and thus the vehicle is treated as a different type, the DTCs stored before the change of specification become inconsistent, which may cripple the system. This is not limited to the error codes. For example, when an ECU stores initial setting values serving as reference values for control, such as a reference vehicle height for initializing a leveling device, a reference steering angle for initializing a swiveling device, and a dirt reference value for initializing a headlamp cleaner, and specifications of the vehicle are changed (e.g., added, deleted or replaced). The initial setting values previously stored in the memory of the ECU and new initial setting values to be newly set for the changed specifications may interfere with each other, which may cause a problem in the system.

In order to address these issues, the ECU may be reset when the vehicle type is changed so as to clear the error codes and initial setting values stored in the memory, and store new error codes and initial setting values that correspond to the current vehicle type. However, in this case, the system cannot be operated until storage of all initial setting values necessary for the system is completed. Thus, during storage of the initial setting values, normal control operations of the system are stopped. For example, the normal control operation by the leveling device is stopped until a reference vehicle height is initialized, the normal control operation by the swiveling device is stopped until a reference steering angle is initialized, and the normal control operation by the headlamp cleaner is stopped until a dirt reference value is initialized. Therefore, the normal control operations by the leveling device and swiveling device are stopped until the initializations of the reference vehicle height and the reference steering angle are completed and thus, during such time, the operations of the entire system is stopped. Accordingly, recovery of the system takes time.

Sensors such as a vehicle height sensor and a steering angle sensor are coupled to the ECU to detect the pitch angle and the steering angle. Based on detection outputs from the sensors, the ECU controls, for example, the leveling device and the swiveling device. The system may be configured to carry out a failsafe operation such that the ECU monitors the outputs from the respective sensors and, when the ECU determines that sensor outputs are abnormal, control operations of the leveling device and the swiveling device are stopped. However, when it is determined for example that the steering angle sensor is abnormal, control operation of the swiveling device and also control operation of the leveling device, which may not be associated with the steering operation, are stopped. In other words the entire system is stopped, until the steering angle sensor is recovered.

SUMMARY

Illustrative aspects of the invention provide a vehicle headlamp system configured to avoid breakdown of the entire system, enable a quick recovery of the system, and ensure a normal operation of the system.

According to an aspect of the invention, a vehicle headlamp system is provided. The vehicle headlamp system includes a headlamp having control devices, and an ECU configured to control the control devices respectively. Each of the control devices is configured to control and change a light irradiation condition of the headlamp. The ECU stores vehicle constants, error code information and initialization information corresponding to different types of vehicles, respectively, and controls the control devices in accordance with the stored information. When a vehicle type is changed, the ECU selects at least one of the vehicle constants that corresponds to the changed vehicle type, clears the stored error code information and the initialization information after selecting the vehicle constant(s), stores initialization information that corresponds to the changed vehicle type in accordance with the selected vehicle constant(s), and initializes the control devices in accordance with the stored initialization information. The ECU is configured to recognize dependencies between the control devices and, if the control devices include a first control device that is independent, the ECU executes a normal control by the first control device directly after initializing the first control device.

Other aspects and advantages of the invention will be apparent from the following description, the drawings and the claims.

BRIEF DESCRIPTION OF THE DRAWINGS

FIG. 3 is a diagram illustrating how vehicle constants are stored;

DETAILED DESCRIPTION

Figure 1:
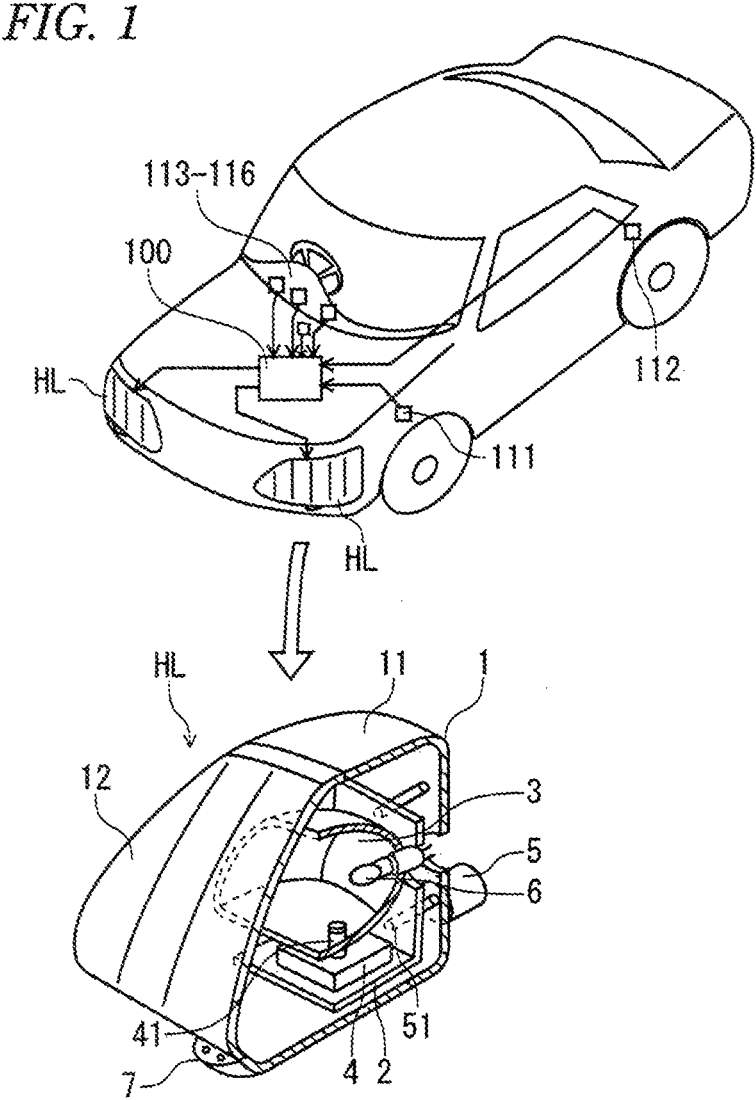
FIG. 1 is a schematic view of the configuration of a vehicle having a headlamp system according to an example of the invention.

According to an example embodiment of the invention, a vehicle headlamp system includes a headlamp having multiple control devices, and an ECU configured to control the control devices respectively. Each of the control devices is configured to control and change a light irradiation condition of the headlamp. The ECU stores vehicle constants, error code information and initialization information corresponding to different types of vehicle respectively, and controls the control devices in accordance with the stored information. When a vehicle type is changed, the ECU selects at least one of the vehicle constants that corresponds to the changed vehicle type, clears the stored error code information and the initialization information after selecting the one or more vehicle constants, stores initialization information that corresponds to the changed vehicle type in accordance with the selected vehicle constant(s), and initializes the control devices in accordance with the stored initialization information. The ECU is configured to recognize dependencies between the control devices and, if the control devices include a first control device that is independent, the ECU executes a normal control by the first control device directly after initializing the first control device.

Thus, even when initialization of other control devices is not completed, normal control by the first control device is started. Therefore, quick recovery of the vehicle headlamp system is achieved.

If the control devices include a second control device that is dependent on another of the control devices, the ECU stops normal control by the second control device until initialization of the other control device is completed.

That is, normal operation by the second control device is carried out after initializing the other control device on which the second control device depends. Therefore, normal control by the second control device is ensured.

For example, the control devices can include a leveling device configured to control and change a light irradiation direction of the headlamp in up and down directions and a swiveling device configured to control and change the light irradiation direction in right and left directions. The ECU can be configured to recognize the leveling device as the first control device, and recognize the swiveling device as the second control device that is dependent on the leveling device such that normal control by the swiveling device is stopped until initialization of the leveling device is completed. In this case, normal control by the leveling device is carried out even when initialization of the swivel device is not yet completed.

The vehicle headlamp system can further include multiple control-related devices respectively related to at least one of the control devices. The ECU can be configured to check whether each of the control-related devices is normal or abnormal, and to check dependencies of each of the control devices on the respective control-related devices such that, if one of the control devices is not dependent on one of the control-related devices, normal control by the one of the control devices is carried out irrespective of whether the one of the control-related devices is normal or abnormal.

That is, even when the one of the control-related devices is abnormal, normal control by the one of the control devices is started. Therefore, quick recovery of the vehicle headlamp system is achieved.

Next, a description is given of an example embodiment for carrying out the invention. As shown in FIG. 1, headlamps HL are mounted on right and left sides of a front portion of the vehicle respectively. Each of the headlamps HL has multiple control devices to control and change light irradiation conditions of the headlamp HL such as a light irradiation direction of the headlamp HL. According to the illustrated embodiment, the control devices include a leveling device configured to control and change a lamp optical axis of the headlamp HL in up and down directions, a swiveling device configured to control and change the lamp optical axis of the headlamp HL in right and left directions, and a headlamp cleaner configured to clean away dirt, such as mud, stuck to the front cover of the headlamp HL. Although FIG. 1 shows a typical section configuration of the left headlamp HL, a lamp body 11 and a transparent front cover 12 cooperate together in constituting a lamp housing 1. Within the lamp housing 1, there is mounted a bracket 2 which can be inclined in the vertical direction and, on the bracket 2, there is supported a reflector 3. On the bracket 2, there is supported a swivel actuator 4 having an output shaft 41 rotatable in the horizontal direction. The drive shaft 41 is connected to the reflector 3, thereby constituting a swiveling device which can deflect the reflector 3 in the horizontal direction. On the reflector 3, a light source 6 is supported. The light source 6 can be a light bulb or any other kind of suitable light source. Also, the lower portion of the bracket 2 is connected to a drive rod 51 provided on the leveling actuator 5. Due to the operation of the leveling actuator 5, the bracket 2 can be inclined in the vertical direction and, with the inclining movement of the bracket 2, the reflector 3 can be inclined in the vertical direction integrally with the bracket 2, thereby constituting a leveling device which is used to deflect the lamp optical axis in the vertical direction. Also, at a position opposite to the front surface of the front cover 12, there is disposed an ejection nozzle 7 for ejecting cleaning water. Specifically, the ejection nozzle 7 is configured as a headlamp cleaner which, when a cleaning pump having a headlamp cleaner motor (not shown) serving as a drive source is driven, ejects the cleaning water toward the front cover 12 to clean mud or the like stuck to the surface of the front cover 12.

There also is known a vehicle employing as a headlamp, instead of the headlamp HL shown in FIG. 1, a cornering lamp configured such that multiple lamp units are mounted within a lamp housing. These lamp units are turned on selectively or simultaneously to change the light irradiation area of the headlamp. Since such cornering lamp can have a function similar to a swiveling device for deflecting the lamp optical axis in the horizontal direction, this cornering lamp is regarded as an example of a swiveling device here.

Figure 2:
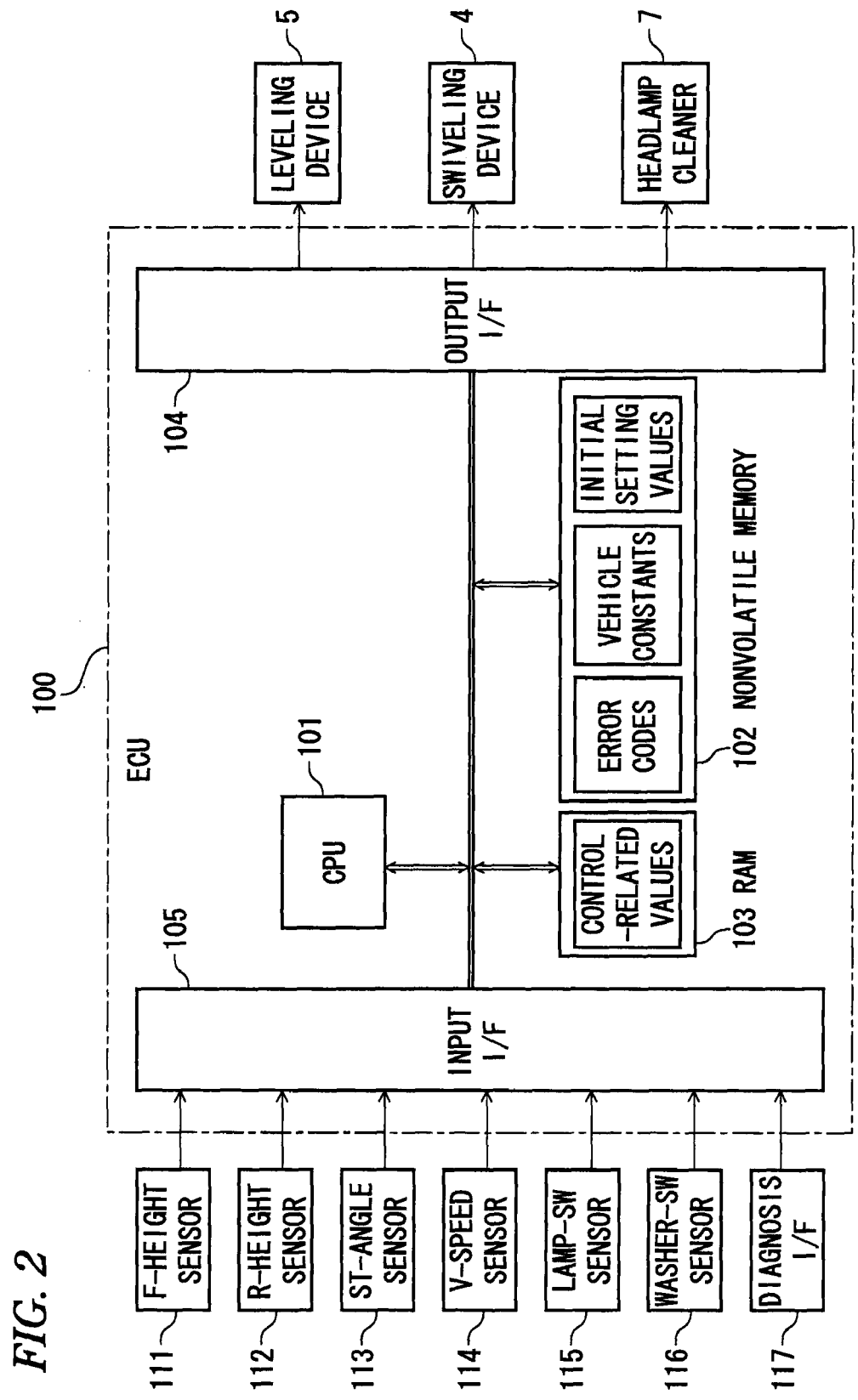
FIG. 2 is a block diagram of a configuration of the headlamp system.

The above-mentioned leveling device (leveling actuator) 5, swiveling device (swivel actuator) 4 and headlamp cleaner (ejection nozzle) 7 are controlled by an ECU 100. As shown in FIG. 2, the ECU 100 includes: a microprocessor (which is hereinafter referred to as a CPU) 101; a nonvolatile memory 102 (e.g., a flash ROM) for storing a control program for operating the CPU 101 and also for storing type information; and a RAM 103 which stores information about the control. Also, to control the leveling device 5, swiveling device 4 and headlamp cleaner 7, the ECU 100 further includes an output interface (output I/F) 104 for providing control information for control of these devices and input interface (input I/F) 105 for entering various kinds of information from control-related devices.

The above-mentioned control-related devices are for detecting information according to which the ECU 100 can carry out it control operations, or for entering and providing information about an error code and the like. As the former control-related device, as shown in FIG. 1 as well, there are available a front vehicle height sensor 111 for detecting the vehicle height in the front wheel of the vehicle, and a rear vehicle height sensor 112 for detecting the vehicle height in the rear wheel of the vehicle. Also, as a device for detecting the running state of the vehicle, there are available a steering angle sensor 113 for detecting a steering angle corresponding to the steering operation of a driver, and a vehicle speed sensor 114 for detecting the running speed of the vehicle. Further, there are available a lamp switch sensor 115 for detecting the state of a headlamp switch to be operated by the driver, and a washer switch sensor 116 for detecting the state of a washer switch to be operated when cleaning a front glass. On the other hand, as the latter control-related device, there is available a diagnosis I/F 117 which is interposed between the ECU 100 and a tester connected to the outside for entering an error code showing the fault history of a vehicle incorporating the ECU 100 therein.

The nonvolatile memory 102 stores, as the type information, vehicle constants specific to individual types of vehicle, initial setting values, and error codes. The vehicle constants are constants which are specific to individual types of vehicle. For example, FIG. 3 shows examples of the vehicle constants when vehicle types A, B and C are applicable. Specifically, type A uses all functions of the leveling device 5, swiveling device 4 and headlamp cleaner 7. In the applicable items in FIG. 3, vehicle constants, which correspond to the respective devices, are entered. Here, a circle indicates that the vehicle constant is entered. Type B has the functions of the leveling device and swiveling device. Thus, in the applicable items, vehicle constants are entered. However, in the item of the headlamp cleaner, a vehicle constant in not entered; instead, a default value is entered. Here, an x mark shows that a default value is entered. Type C has the functions of the leveling device and headlamp cleaner. Thus, in the applicable items, vehicle constants which correspond to the respective devices are entered. However, in the item of the swiveling device, a vehicle constant in not entered; instead, a default value, indicated by an x mark, is entered.

Referring to the specific examples of these vehicle constants, for example, since the leveling device 5 is influenced by the dimensions of headlamps, the spring constants of the suspension and tire of a vehicle, the wheelbase of a vehicle, the seat positions of a vehicle, and the maximum loading capacity of a vehicle, in the leveling device 5, the values of these items are stored as the vehicle constants for every type of vehicle. Also, a difference between a one-vehicle-height-sensor system and a two-vehicle-height-sensor system is stored as a vehicle constant. Here, type A is set as a two-vehicle-height-sensor system, whereas types of vehicles B and C are respectively set as a one-vehicle-height-sensor system. In the swiveling device 4, since the swivel control characteristics of vehicles such as the swivel speeds and swivel angle ranges of vehicles differ from each other depending on whether each of the vehicles is a sports vehicle, a high-class vehicle, a family vehicle, a commercial vehicle or the like, the values of these characteristics are stored as constants. In the headlamp cleaner 7, since the ejection frequency of cleaning water and the time of ejection of cleaning water from the ejection nozzle are influenced by the dimensions of headlamps, especially by the dimension of the front covers of the headlamps, the values of these dimensions are stored for every type of vehicle. These vehicle constants are to be stored in advance in accordance with the respective types of vehicles in which the present ECU is incorporated.

Initial setting values to be stored in the nonvolatile memory 102 are set values which are used as reference values when initializing the leveling devices 5, swiveling devices 4 and headlamp cleaners 7 of the respective types of vehicle. Regarding these initial setting values, the CPU 101 reads out the vehicle set values of the respective types of vehicles from the nonvolatile memory 102 and, according to the read vehicle set values, carries out a necessary operation. Then, the obtained initial setting values are stored into the nonvolatile memory 102. According to the stored initial setting values, there are carried out initializing operations, for example, an operation to initialize the vehicle height value in the leveling device 5, and an operation to initialize the center position of the steering angle in the swiveling device 4.

Also, referring to storage of the error codes into the nonvolatile memory 102, as described above, codes related to the histories of faults such as failures, defects and abnormalities, which have been detected when the ECU 100 carries out a self-diagnostic operation, may be stored into the nonvolatile memory 102 in such a manner that they correspond to their respective types of vehicle.

In the RAM 103, when a vehicle type is set into the ECU 100, there is set a numeric value relating to the control that corresponds to this type. This numeric value can be set in such a manner that, for example, an operator enters it into the RAM 103 directly. Alternatively, numeric values corresponding to the respective types of vehicle also can be stored into the nonvolatile memory 102 in advance and, when a certain type is set, a corresponding numeric value can be read out selectively from the nonvolatile memory 102 and then can be set into the RAM 103. Such numeric values are used as coefficients or the like, for example, in an operation equation which is used to operate initial setting values according to vehicle constants.

In the above configured headlamp system, according to the respective pieces of type information stored in the nonvolatile memory 102, there is set a vehicle constant corresponding to a type in which the present ECU 100 is incorporated. In the RAM 103, there is set a numeric value relating to the control that corresponds to this type. The CPU 101 operates an initial setting value according to the vehicle constant and the numeric value relating to the control, and stores the operation result into the nonvolatile memory 102. The CPU 101 initializes the necessary one of the leveling device 5, swiveling device 4 and headlamp cleaner 7 according to the stored initial setting value. As a result of this, the deflection angles of the lamp optical axis of the headlamp HL in the vertical and horizontal directions are respectively oriented toward the initial set angles. Also, in the headlamp cleaner 7, there are set the ejection frequency and the time of ejection of cleaning water from the ejection nozzle in the cleaning operation.

In this state, the ECU 100 enters therein the detection outputs of the control-related devices, that is, the front vehicle height sensor 111, rear vehicle height sensor 112, steering angle sensor 113, vehicle speed sensor 114, lamp switch sensor 115 and washer switch sensor 116. The ECU 100 carries out a necessary control operation according to the entered detection outputs, and carries out normal control operations on the leveling device 5, swiveling device 4 and headlamp cleaner 7 according to the results of the control operation. The leveling actuator is feed-back controlled following variations in the pitch angle of a vehicle. A control operation is carried out in which the lamp optical axis of the headlamp HL is held at a given angle in the vertical direction with respect to a road surface regardless of the pitch angle variations. In the swivel control operation, according to the detection output of the steering angle sensor 113, the swivel actuator is feed-back controlled following the steering angle of a vehicle, thereby controlling and deflecting the lamp optical axis of the headlamp HL in the horizontal direction. In the headlamp cleaner 7, according to the output of the washer switch sensor 116 when washing the windshield of a vehicle, the cleaning water is ejected from the ejection nozzle onto the front cover 12 of the headlamp HL to thereby clean the front cover 12.

Also, as one of the ECU's self-diagnosis functions, the ECU constantly monitors the control-related devices and checks whether these control-related devices are normal or abnormal. The ECU is configured such that, when it detects any abnormal state, it can set a failsafe state so as to stop normal control operations of the control devices that are related to the abnormal control-related devices.

When the type is changed as the result of addition of an option to the vehicle or change in the function thereof e.g., when a swivel function is additionally applied to type C and type C is thereby changed to type A, the change of type C to type A is set in the ECU 100. When the change of the type is set, the CPU 101 selects the vehicle constant of type A from the vehicle constants stored in the nonvolatile memory 102. Also, simultaneously with this, the CPU 101 sets a numeric value related to the control corresponding to type A into the RAM 103. From now on, according to the vehicle constant of type A and the control-related value, initialization and normal control operation are carried out. Also, in this normal control operation, a self-diagnosis operation is carried out through the diagnosis IN 117.

In this case, as described above, a problem may arise in the system. For example, the changed vehicle type may not be matched to the error code stored in the nonvolatile memory 102; or, the initial setting value stored in the nonvolatile memory 102 and an initial setting value to be newly set relating to the changed vehicle type may interfere with each other. Further, since the system is configured such that, after the leveling device 5, swiveling device 4 and headlamp cleaner 7 are all initialized, control operation by the ECU 100 can be carried out, during such initialization, the control operation of the ECU 100 (i.e., operation of the entire system) is stopped as described above. Similarly, when the control-related devices are found to be abnormal, the entire system is stopped as described above.

Figure 4:
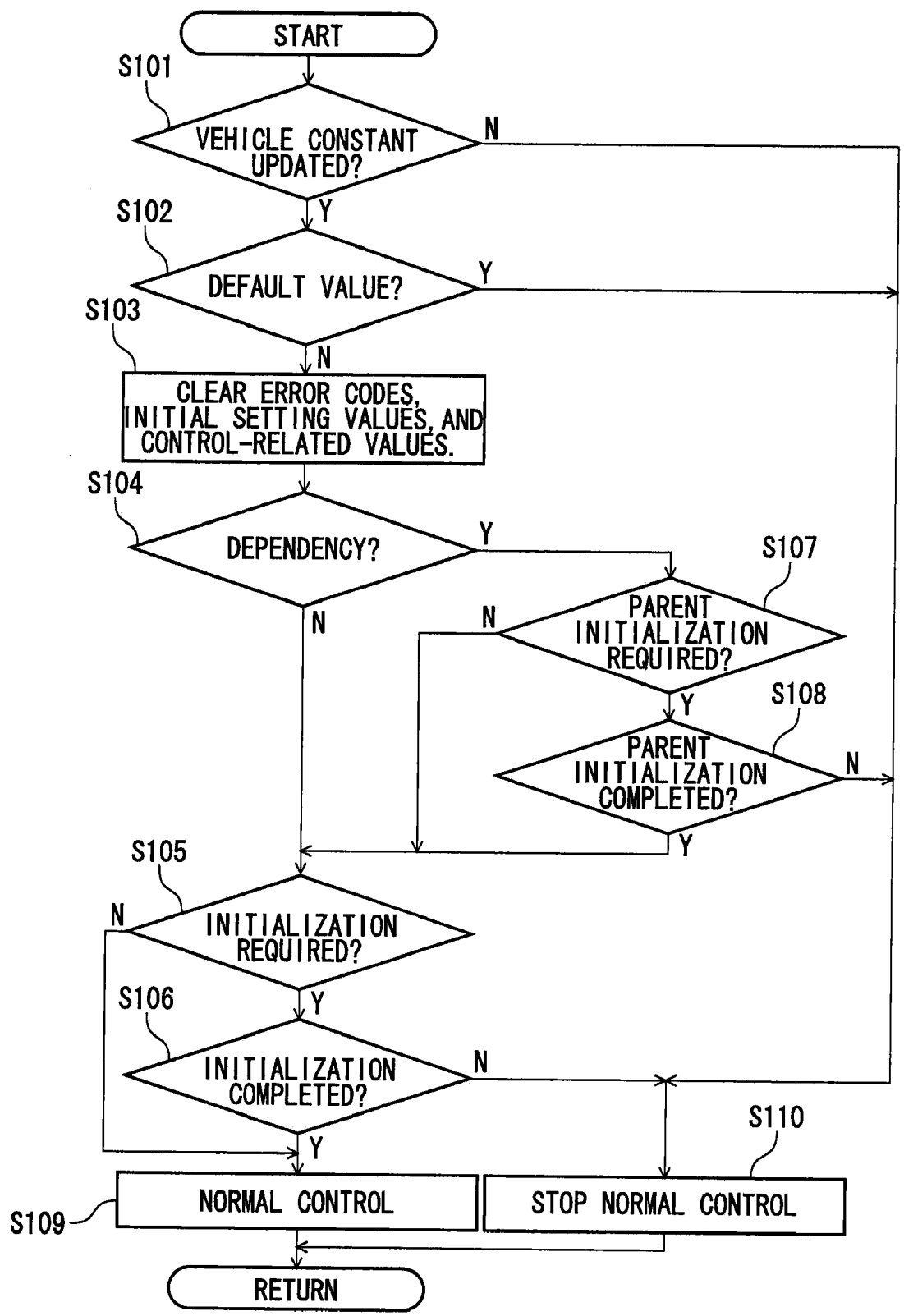
FIG. 4 is a flow chart illustrating operations of an ECU.

In order to improve the above inconveniences, according to the present example embodiment, there is carried out the control operation that is based on a flow chart shown in FIG. 4. First, it is checked whether a vehicle constant is newly selected or not when the type is changed (S101). If not selected, normal control operations of the leveling device 5, swiveling device 4 and headlamp cleaner 7 are stopped (S110). Even when the vehicle constant is selected, it is checked whether the selected vehicle constant is a specific value or a default value (S102). If the default value is found, normal control operations of the respective devices are stopped similarly (S110). If vehicle constants other than the default value are selected, the error code and initial setting value stored in the nonvolatile memory 102 are cleared and, at the same time, a numeric value, which is set in the RAM 103 and is related to the control operation, is cleared (S103). By clearing the nonvolatile memory 102 and RAM 103 in this manner, even when an error code, an initial setting value and a control-related value are newly stored in the following processes, they are prevented from interfering with the past error code and initial setting value, so as to be able to prevent a malfunction from occurring in the following processes.

Next, the CPU 101 checks a device to be controlled for its dependency (S104). According to the present example embodiment, the leveling device 5, swiveling device 4 and headlamp cleaner 7 are checked to determine whether or not one of them to be controlled is dependent on the other. For example, unless initialization of the leveling device 5 is completed, the swiveling device 4 may swivel in a state where the lamp optical axis thereof faces upward. Therefore, the swiveling device 4 is dependent on the leveling device 5. On the other hand, when the leveling device 5 is controlled in a state where the deflecting position in the horizontal direction of the lamp optical axis is set at any angle position a problem in the leveling device 5 does not arise. Also, the leveling device 5 has no connection with the control of the headlamp cleaner 7. Therefore, the leveling device 5 is not dependent on the other device. When the device to be controlled is a non-dependent device, it is checked whether or not it is a device requiring its own initialization (S105). When it is found that it does not require initialization, the control operation moves to the normal control operation (S109). Also, for the device requiring its initialization, it is checked whether or not the initialization thereof is completed (S106). When initialization of the device is not completed, its initialization is carried out. In this initialization, according to a vehicle constant newly selected from the nonvolatile memory 102 and a control-related value newly set in the RAM 103 simultaneously with the vehicle constant, an initial setting value is operated. This initial setting value is stored into the nonvolatile memory 102, and the present initialization is carried out using this initial setting value. After initialization is completed, the control operation moves to normal control operation of the present device.

For example, in the leveling device 5, since it has no dependency on the swiveling device 4 or headlamp cleaner 7, it is checked whether or not initialization of the leveling device 5 is necessary. Since initialization of the leveling device 5 is necessary, for example, the vehicle height values on the front and read sides are initialized. After execution of this initialization, the control operation moves to normal control operation of the leveling device 5. Therefore, since normal control operation of the leveling device 5 is started even in a state where neither the swiveling device 4 nor the headlamp cleaner 7 is initialized, when the vehicle type is changed, the quick recovery of the headlamp system can be realized. In the headlamp cleaner 7 as well, since it is not dependent on the leveling device 5 or swiveling device 4, even in a state where neither the leveling device 5 nor the swiveling device 4 is initialized, after completion of initialization of the ejection frequency and the time of ejection, the control operation can be moved to normal control operation of the headlamp cleaner 7 so as to realize quick recovery of the headlamp system when the vehicle type is changed.

On the other hand, in Step S104, when the device to be controlled is a device dependent on the other, it is checked whether or not the device, on which the device to be controlled is dependent, requires initialization (S107). When such initialization is necessary, it is checked whether or not such initialization is completed (S108). When initialization of this device is not completed, normal control operation of this device is stopped until initialization is completed (S110). Also, when initialization of this device is completed, as described above, it is checked whether or not initialization of this device is necessary (S105). When not necessary, normal control operation of this device is carried out (S109). Also, when necessary, it is checked whether or not initialization of this device is completed (S106). When not completed, initialization of this device is carried out and, after execution of this initialization, normal control operation of this device is carried out (S109). However, in this case, the initialization of the present device may also be carried out before execution of the initialization of the device on which the present device is dependent.

Figure 5:
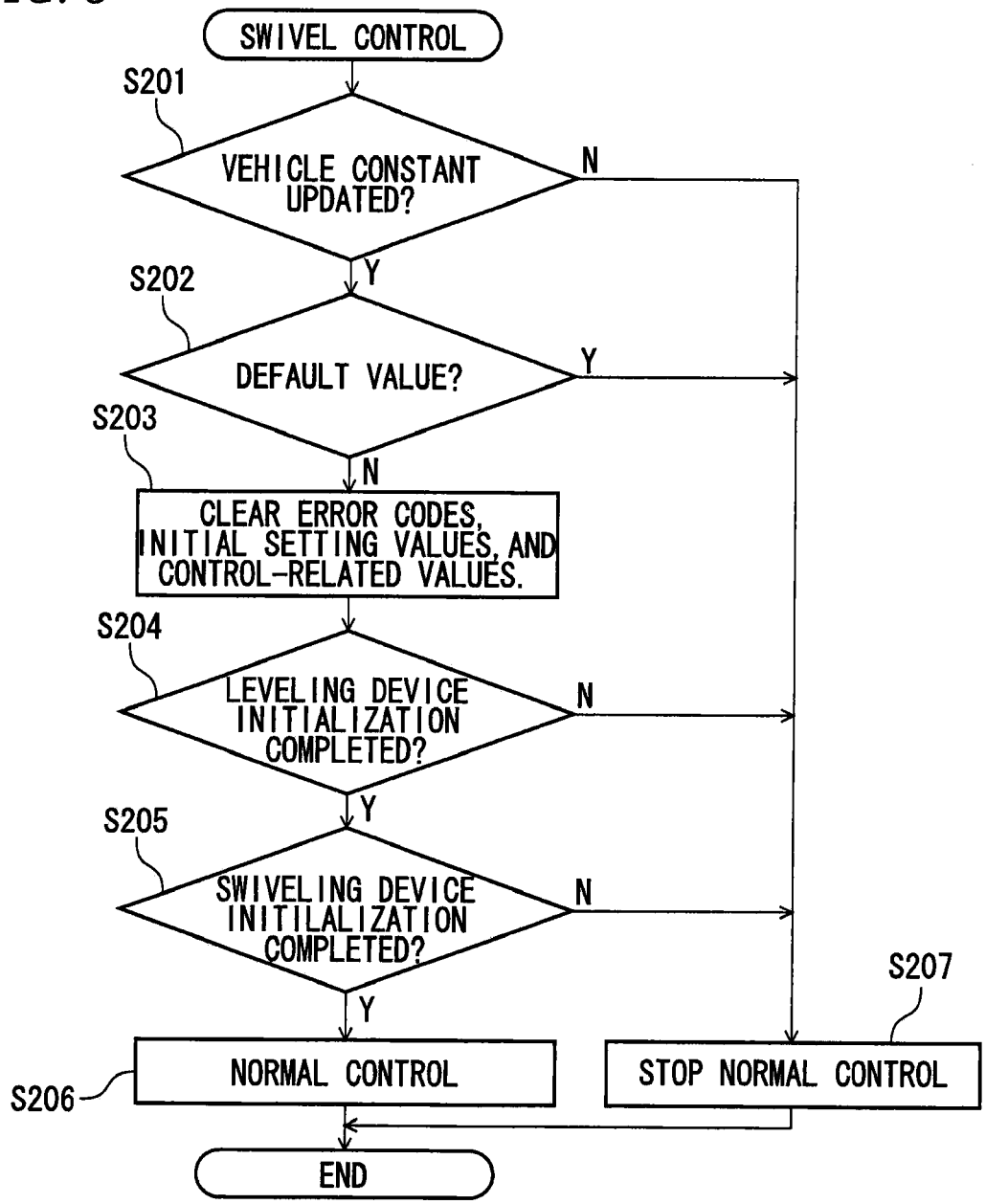
FIG. 5 is a flow chart illustrating a control operation of a swiveling device.

As shown, for example, in FIG. 5, in the control operation of the swiveling device 4, it is confirmed whether or not a vehicle constant is selected (S201). When the vehicle constant is not a default value (S202), the error code and initial setting value stored in the nonvolatile memory 102, and a numeric value, which is set in the RAM 103 and is related to the control operation, are cleared (S203). The leveling device 5, on which the swiveling device 4 is dependent, is checked as to whether or not its initialization is completed (S204). When initialization of the leveling device 5 is not completed, normal control operation of the swiveling device 4 is stopped (S207). Also, when initialization of the leveling device 5 is completed, it is checked whether or not initialization of the swiveling device 4 is completed (S205). When not completed, after the center position of the steering angle is initialized, there is carried out normal control operation of the swiveling device 4. Therefore, when the leveling device 5 starts its normal control operation, there can be carried out the normal control operation of the swiveling device 4 immediately.

In this manner, in the case of the dependency-free device such as the leveling device 5 and headlamp cleaner 7 that are not dependent on other device, whether the other device is initialized or not, after the dependency-free device is initialized, normal control operation thereof is possible. Therefore, it is possible to avoid stopping the ECU 100 (i.e., stopping operation of the entire system until the initialization of the other device is completed), so as to realize quick recovery of the headlamp system. On the other hand, in the device such as the swiveling device 4 that is dependent on the other device, since the operation of the headlamp system is stopped until the initialization of the other device on which the present device is dependent is completed, in a state where the leveling device 5 is not initialized, normal control operation of the swiveling device 4 will not be carried out, so as to prevent the headlamp system from raising a problem.

Further, according to the present example embodiment, normal control operations of the respective control devices such as the leveling device 5, swiveling device 4 and headlamp cleaner 7 are stopped or carried out according to the above-mentioned mutual dependency. In other embodiments, normal control operations of the respective control devices also can be stopped or carried out by checking the control-related devices for their states. That is, as described above, the ECU 100, as one of the self-diagnosis functions thereof, constantly monitors the control-related devices such as the front vehicle height sensor 11, rear vehicle height sensor 112, steering angle sensor 113, vehicle speed sensor 114, lamp switch sensor 115 and wash sensor 116, and checks whether or not these control-related devices are normal. When the control-related devices are found to be abnormal, the headlamp system is set in a failsafe state. The ECU 100 can check the respective control devices and control-related devices for their mutual dependency and, in the case that a control-related device checked is found to have no dependency with a control device, the result of the check can be ignored and normal control operation of the present control device can be carried out.

For example, referring again to FIG. 3, in the case that the leveling device 5 of the type B is a device to be controlled, since the present leveling device 5 is of a one-vehicle-height-sensor type, one vehicle height sensor, here, the rear vehicle height sensor 112 is checked whether or not it is normal. When the rear vehicle height sensor 112 is found to be normal, normal control operation of the leveling device 5 is carried out but, when it is found to be abnormal, normal control operation is stopped. On the other hand, in the case that the leveling device 5, the type of which is changed to type A, is a device to be controlled, since the present leveling device 5 is of a two-vehicle-height-sensor type, when at least one of the front vehicle height sensor 111 and rear vehicle height sensor 112 is found to be abnormal, normal control operation of the leveling device 5 is stopped. When both of the sensors are found to be normal, normal control operation of the leveling device 5 is carried out. Therefore, as opposed to the above-mentioned case, when the type is changed from type A to type B, since the leveling device 5 of the type B has no dependency on the front vehicle height sensor 111, the result of the check of the front vehicle height sensor 111 for its normality or abnormality is ignored. Thus, regardless of the result of the check of the front vehicle height sensor 111, normal control operation of the leveling device 5 is carried out.

Since the check of the control-related devices for the normality or abnormality is carried out only on the control-related devices that are related to the control devices to be controlled, this check will not be influenced by the check of the normality or abnormality of the control-related devices that are related to other control devices. For example, when the steering angle sensor 113 is found to be abnormal, normal control operation of the swiveling device 4 is stopped, but normal control operations of the leveling device 5 and headlamp cleaner 7 are carried out. On the other hand, in the case of the control devices having a dependency, for example, when the two vehicle height sensors 111 and 112 are both found to be abnormal, normal control operation of the leveling device 5 is stopped and, as described above, normal control operation of the swiveling device 4 having a dependency with the leveling device 5 is also stopped.

As described above, when the control-related devices are found to be abnormal, the ECU 100 sets the system in a fail-safe state. However, even in this case, for the control device having no dependency with the control-related devices which have been found to be abnormal, normal control operation thereof will not be stopped. Therefore, even when part of the control-related devices are found to be abnormal, the entire system will not be stopped, and quick recovery of the system can be realized. Here, the control-related devices are not limited to the sensors according to the illustrated embodiment For example, when the diagnosis I/F 117 is found to be abnormal and the headlamp system is thereby set in a failsafe state (or when, in a system including a display device for showing the operation state of the headlamp system, the display device is found to be abnormal and the system is thereby set in a failsafe state), normal control operations of the leveling device, swiveling device and headlamp cleaner, respectively, having no dependency on such devices, are not stopped, but are carried out, thereby ensuring normal operation of the system.

Although the swiveling device 4 described with reference to the example of FIG. 1 is configured such that it deflects and controls the reflector 3 in the horizontal direction, a swiveling device may be a cornering lamp device for changing the light irradiation area of a lamp in the horizontal direction. The swiveling device can be any suitable device that is configured to change the light irradiation area of the lamp in right and left directions to change the substantial center of the light irradiation area. This also applies to a leveling device. That is, the leveling device may be any suitable device that is configured to change the light irradiation area of a lamp in up and down directions.

Although the foregoing description is applied to a headlamp including a leveling device, a swiveling device and a headlamp cleaner, the headlamp may include a smaller number of control devices or other devices not described above, but capable of automatically controlling the light irradiation and distribution of a lamp, for example, an adaptive front-lighting system (AFS) and an adaptive driving beam (ADB). When a system include such a headlamp, the respective devices are checked for their dependencies and, according to the dependency between them, normal control operation of the devices are stopped or carried out. Similarly, in a system which includes sensors serving as control-related devices other than those described above, by checking such sensors and the respective devices for their dependency, normal control operations of the devices can be stopped or carried out.

What is claimed is:

1. A vehicle headlamp system comprising:
   a headlamp comprising a plurality of control devices; and
   an ECU configured to control the control devices respectively,
   wherein each of the control devices is configured to control and change a light irradiation condition of the headlamp,
   wherein the ECU stores vehicle constants, error code information and initialization information corresponding to different types of vehicles respectively, and controls the control devices in accordance with the stored information,
   wherein, when a vehicle type is changed, the ECU selects at least one of the vehicle constants that corresponds to the changed vehicle type, clears the stored error code information and the initialization information after selecting the at least one of the vehicle constants, stores initialization information that corresponds to the changed vehicle type in accordance with the selected vehicle constant, and initializes the control devices in accordance with the stored initialization information, and
   wherein the ECU is configured to recognize dependencies between the control devices and, if the control devices comprise a first control device that is independent, the ECU executes normal control by the first control device directly after initializing the first control device,
   wherein, if the control devices comprise a second control device that is dependent on the first control device or another of the control devices, the ECU stops normal control by the second control device until initialization of the first control device or the other of the control devices is completed,
   wherein the control devices comprise:
   a leveling device configured to control and change a light irradiation direction of the headlamp in up and down directions; and
   a swiveling device configured to control and change the light irradiation direction in right and left directions,
   wherein the ECU is configured to recognize the leveling device as the first control device, and to recognize the swiveling device as the second control device that is dependent on the leveling device such that normal control by the swiveling device is stopped until initialization of the leveling device is completed.

2. The vehicle headlamp system according to claim 1, further comprising a plurality of control-related devices that are respectively related to at least one of the control devices,
   wherein the ECU is configured to check whether each of the control-related devices is normal or abnormal, and to check dependencies of each of the control devices on the respective control-related devices such that, if one of the control devices is not dependent on one of the control-related devices, normal control by said one of the control devices is carried out irrespective of whether said one of the control-related devices is normal or abnormal.

* * * * *